(12) United States Patent
Tsuda et al.

(10) Patent No.: US 12,258,493 B2
(45) Date of Patent: Mar. 25, 2025

(54) ADHESIVE COMPOSITION, FILM-LIKE ADHESIVE AND MULTILAYER FILM

(71) Applicant: TOAGOSEI CO., LTD., Tokyo (JP)

(72) Inventors: Takashi Tsuda, Nagoya (JP); Makoto Imahori, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 18/246,139

(22) PCT Filed: Sep. 21, 2021

(86) PCT No.: PCT/JP2021/034529
§ 371 (c)(1),
(2) Date: Mar. 21, 2023

(87) PCT Pub. No.: WO2022/065286
PCT Pub. Date: Mar. 31, 2022

(65) Prior Publication Data
US 2024/0010884 A1    Jan. 11, 2024

(30) Foreign Application Priority Data

Sep. 23, 2020 (JP) .................................. 2020-158485

(51) Int. Cl.
*C09J 7/30* (2018.01)
*C09J 123/26* (2006.01)

(52) U.S. Cl.
CPC ....... *C09J 123/26* (2013.01); *C09J 2301/312* (2020.08)

(58) Field of Classification Search
CPC ........... C09J 123/26; C09J 7/30; B32B 27/08; B32B 27/00
See application file for complete search history.

(56) References Cited

U.S. PATENT DOCUMENTS

| 5,202,192 A | 4/1993 | Hope et al. |
| 2018/0370286 A1 | 12/2018 | Nakakita et al. |

FOREIGN PATENT DOCUMENTS

| EP | 2559747 A1 * | 2/2013 | ............. B32B 15/08 |
| JP | 2006036920 A | 2/2006 | |
| JP | 2013532197 A | 8/2013 | |
| JP | 2014208784 A | 11/2014 | |
| JP | 2015105294 A | 6/2015 | |
| JP | 2017095685 A | 6/2017 | |
| JP | 2017109613 A | 6/2017 | |
| JP | 2019099769 A | 6/2019 | |

(Continued)

OTHER PUBLICATIONS

International Search Report (with English translation) and Written Opinion for PCT/JP2021/034529, mailed on Jan. 11, 2022, 10 pages.

(Continued)

*Primary Examiner* — Daniel McNally
(74) *Attorney, Agent, or Firm* — Dority & Manning, P.A.

(57) ABSTRACT

An adhesive composition includes an acid-modified polyolefin (A) that is graft-modified with 0.2 to 5 parts by mass of an acid compound (a2) with respect to 100 parts by mass of a polyolefin (a1), in which the adhesive composition has a storage modulus of from 130 to 330 MPa at 23° C. as measured by a rheometer and has a yield modulus of from 30 to 120 MPa at 23° C. in a tensile test.

7 Claims, 1 Drawing Sheet

(56) References Cited

FOREIGN PATENT DOCUMENTS

| WO | WO 2011129080 A1 | 10/2011 |
| WO | WO 2015046378 A1 | 4/2015 |
| WO | WO 2018221037 A1 | 4/2020 |

OTHER PUBLICATIONS

Chinese Office Action for corresponding Application No. 202180064799.9, dated Jan. 25, 2025, 6 pages.

* cited by examiner

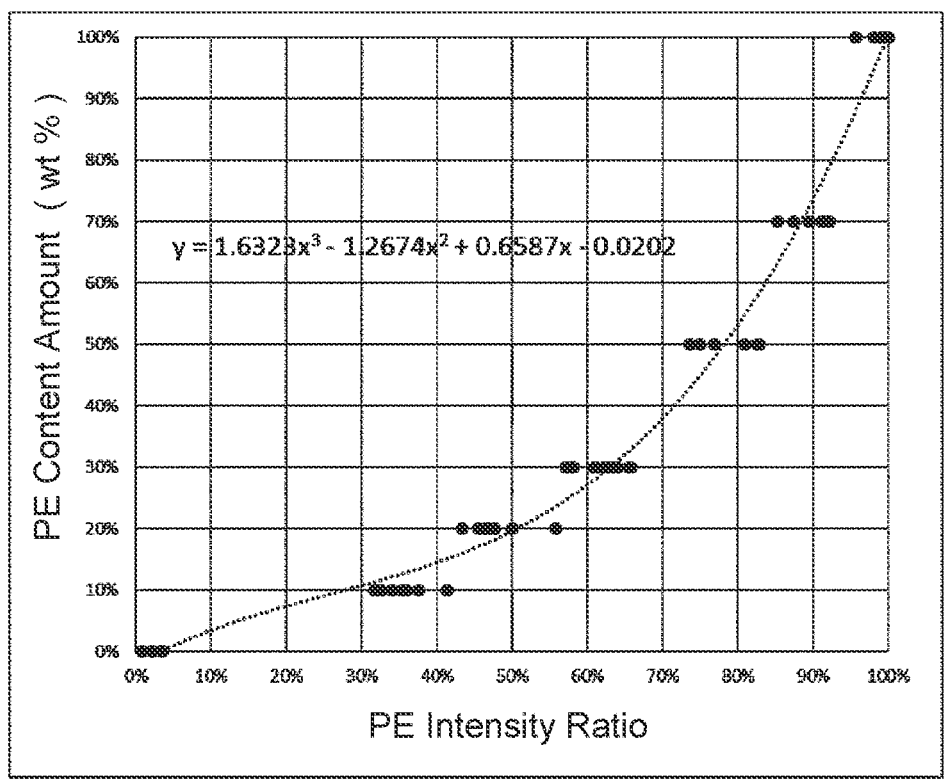

ADHESIVE COMPOSITION, FILM-LIKE ADHESIVE AND MULTILAYER FILM

CROSS-REFERENCE TO RELATED APPLICATIONS

The present application is a US national phase entry of International Patent Application No. PCT/JP2021/034529, filed on Sep. 21, 2021, which is based upon and claims the right of priority to JP 2020-158485, filed on Sep. 23, 2020, both of which are hereby incorporated by reference herein in their entirety for all purposes.

TECHNICAL FIELD

The present invention relates to an adhesive composition that can be suitably used for bonding various parts, a film-like adhesive that is formed by processing the adhesive composition into a film, and a multilayer film that uses the film-like adhesive.

BACKGROUND ART

Polyolefins, represented by polypropylene, are lightweight and easy to mold, and are excellent in chemical stability such as water resistance, oil resistance, acid resistance, and alkali resistance. For this reason, polyolefins are processed into molded articles, sheets, or films as hot-melt adhesives and used to bond various parts. The advantage of using thermoplastic polyolefins as adhesives is that, in addition to the aforementioned characteristics, adhesion operation is easy and adhesion can be achieved in a short period of time, which is particularly effective in industrial production. In addition, polyolefins are easy to manage due to their extremely high storage stability and low toxicity and fire hazard.

Polyolefins are highly hydrophobic resins and, as they are, have low adhesiveness to inorganic substances such as metal and glass. Polyolefins into which hydrophilic groups have been introduced are commonly used for bonding inorganic substances. As a method for introducing hydrophilic groups, a method of copolymerizing a monomer having a hydrophilic group with an olefin monomer, and a method of graft-modifying a polyolefin with a monomer having a hydrophilic group are known. In the case of propylene, which is difficult to copolymerize with a monomer having a hydrophilic group, the latter method is often employed. By using a carboxylic acid or a carboxylic acid anhydride as a monomer having a hydrophilic group and grafting polypropylene with the carboxylic acid or the carboxylic acid anhydride, so-called acid modification, adhesive strength of polypropylene to inorganic substances can be increased. Adhesion of inorganic substances by acid-modified polyolefins is also described in prior art documents. For example, Patent Document 1 describes an acid-modified polypropylene as an adhesive between metal and a nylon resin.

PRIOR ART DOCUMENT

Patent Document

Patent Document 1: Japanese Patent Application Laid-Open (JP-A) No. 2017-109613

SUMMARY OF THE INVENTION

Technical Problem

However, even if a bonded body that includes an inorganic material such as metal and glass as an adherend is produced using an acid-modified polyolefin, there has been a problem that adhesion durability is low under an environment where the bonded body is in continuous or intermittent contact with moisture. This is due to gradual intrusion of moisture into the bonding interface, and the moisture causes the bonding surface of the bonded body to peel off. In particular, when the bonded body is immersed in water and held for a long period of time while being subjected to peeling stress, the inorganic substance is easily peeled off from the acid-modified polyolefin. Such low adhesion durability in a high-humidity atmosphere and in water is one of the problems with acid-modified polyolefins that have not been solved yet. Aforementioned Patent Document 1, which describes an acid-modified polypropylene, does not mention anything about adhesiveness of the acid-modified polypropylene when the bonding portion is in contact with moisture for a long period of time.

One solution to this problem is to reduce amount of acid modification to keep the bonding interface hydrophobic. However, if amount of acid modification is reduced, it becomes a problem that adhesive strength of acid-modified polyolefins is weaken. It is difficult to achieve both hydrophobization by reducing amount of acid modification and adhesive strength of acid-modified polyolefins, and acid-modified polyolefins having sufficient adhesion durability in a high-humidity atmosphere and in water have not been obtained. An object of one embodiment of the present invention is to provide an adhesive composition having both high adhesive strength and high adhesion durability in a wide temperature range from a low temperature to a high temperature, even in a high-humidity atmosphere and in water.

Solution to Problem

In order to solve the aforementioned problems of polyolefins, the present inventors have studied various methods of increasing adhesion durability to inorganic substances such as metal and glass in water, and have completed the present invention.

The means for solving the aforementioned problems include the following aspects.

[1] An adhesive composition, including an acid-modified polyolefin (A) that is graft-modified with 0.2 to 5 parts by mass of an acid compound (a2) with respect to 100 parts by mass of a polyolefin (a1),
  in which the acid compound (a2) is selected from the group consisting of an unsaturated carboxylic acid, an unsaturated carboxylic acid anhydride, and a combination thereof,
  in which the polyolefin (a1) is selected from the group consisting of a polymer blend of polyethylene and polypropylene, a propylene-ethylene copolymer, and a combination thereof,
  in which a mass ratio of ethylene units and propylene units (ethylene units/propylene units) contained in the polyolefin (a1) is within a range of from 15/85 to 35/65, and
  in which the adhesive composition has a storage modulus of from 130 to 330 MPa at 23° C. as measured by a rheometer and has a yield modulus of from 30 to 120 MPa at 23° C. in a tensile test.

[2] The adhesive composition according to [1], in which a content of the acid-modified polyolefin (A) is 60% by mass or more.

[3] The adhesive composition according to [1] or [2], having a storage modulus of from 150 to 300 MPa at 23° C. as measured by a rheometer and having a yield modulus of from 50 to 100 MPa at 23° C. in a tensile test.

[4] The adhesive composition according to any one of [1] to [3], having a tensile breaking strain of 200% or more at each of 23° C. and −10° C.

[5] The adhesive composition according to any one of [1] to [4], having a tensile yield strain of 11% or more at 23° C.

[6] A film-like adhesive, having a thickness of from 10 to 300 μm and including the adhesive composition according to any one of [1] to [5].

[7] A multilayer film, including a substrate layer and a surface layer that is layered on the substrate layer:

in which the substrate layer contains a heat-resistant resin having a softening temperature of 130° C. or higher and has a thickness of from 50 to 300 μm; and in which the surface layer is the film-like adhesive according to [6] and has a thickness of from 10 to 100 μm.

Advantageous Effects of Invention

According to the present invention, it is possible to provide an adhesive composition having both high adhesive strength and high adhesion durability in a wide temperature range from a low temperature to a high temperature, even in a high-humidity atmosphere and in water.

BRIEF DESCRIPTION OF DRAWINGS

FIG. 1 is a calibration curve for converting an absorbance ratio of ethylene units and propylene units into a mass ratio.

DESCRIPTION OF EMBODIMENTS

The adhesive composition includes an acid-modified polyolefin (A).

The acid-modified polyolefin (A) is a polyolefin in which a polyolefin (a1), particularly an unmodified polyolefin (a1) is graft-modified with an acid compound (a2) selected from the group consisting of an unsaturated carboxylic acid, an unsaturated carboxylic acid anhydride, and a combination thereof. Here, the acid-modified polyolefin (A) may partially include a polyolefin (a1) that is not graft-modified with the acid compound (a2). That is, the acid-modified polyolefin (A) may be a polyolefin that is made of a polyolefin (a1), and a polyolefin in which the polyolefin (a1) is graft-modified with the acid compound (a2) selected from the group consisting of an unsaturated carboxylic acid, an unsaturated carboxylic acid anhydride, and a combination thereof. The graft-modified polyolefin generally has a polyolefin chain based on the polyolefin (a1) and a graft chain that is a polymer of the acid compound (a2).

The polyolefin (a1), which is a raw material of the acid-modified polyolefin (A), is selected from the group consisting of a polymer blend of polyethylene and polypropylene, an ethylene-propylene copolymer, and a combination thereof The polyethylene is a polymer containing ethylene units as a main component, and may be a homopolymer or may be a copolymer. The content of ethylene units in the polyethylene is preferably 50% by mass or more, and more preferably 70% by mass or more. Specific examples of the polyethylene include a homopolymer such as a low-density polyethylene, a high-density polyethylene, and a linear low-density polyethylene, copolymers such as an ethylene-diene monomer copolymer, an ethylene-vinyl acetate copolymer, an ethylene-acrylate copolymer, an ethylene-methacrylic acid ester copolymer, and halogen modified products such as a chlorinated polyethylene.

The polypropylene is a polymer containing propylene units as a main component, and may be a homopolymer or may be a copolymer. The content of propylene units in the polypropylene is preferably 50% by mass or more, and more preferably 70% by mass or more. Specific examples of the polypropylene include homopolymers such as an amorphous polypropylene and a crystalline polypropylene, copolymers such as a propylene-diene monomer copolymer, and halogen modified products such as a chlorinated polypropylene.

The ethylene-propylene copolymer is a polymer containing ethylene units and propylene units, and may be composed of only ethylene units and propylene units, or may further contain other monomer units in addition to ethylene units and propylene units. Examples of the ethylene-propylene copolymers containing other monomer units include ethylene-propylene-diene monomer copolymers. The total amount of ethylene units and propylene units in the ethylene-propylene copolymer is preferably 50% by mass or more, more preferably 70% by mass or more, still more preferably 80% by mass or more, particularly preferably 90% by mass or more, and may be 100% by mass.

The polyolefin (a1) encompasses a physical blend made of multiple components of these resins, as well as a reaction blend in which functional groups are reacted between different polymers in a molding machine, a graft copolymer or a block copolymer made of multiple segments, a composition in which a physical blend using these as compatibilizers is microdispersed, and the like.

In all monomer units contained in the polyolefin (a1), the total amount of ethylene units and propylene units is preferably 50% by mass or more, more preferably 70% by mass or more, still more preferably 80% by mass or more, particularly preferably 90% by mass or more, and may be 100% by mass.

The mass ratio of ethylene units and propylene units (ethylene units/propylene units) contained in the polyolefin (a1) is 15/85 or more, and preferably 20/80 or more. The mass ratio of ethylene units and propylene units (ethylene units/propylene units) contained in the polyolefin (a1) is 35/65 or less, and preferably 30/70 or less. When the polyolefin (a1) is a polymer blend of polyethylene and polypropylene, the "mass ratio of ethylene units and propylene units contained in the polyolefin (a1)" means a mass ratio of ethylene units and propylene units in all of the monomer units contained in the polyethylene and the polypropylene.

The mass ratio of ethylene units and propylene units is determined by an absorbance ratio of a characteristic absorption of polyethylene (719 cm$^{-1}$) and a characteristic absorption of polypropylene (1167 cm$^{-1}$) in an IR spectrum. Specifically, a calibration curve to convert an absorbance ratio of ethylene units and propylene units into a mass ratio is used. A calibration curve can be created by formulating commercially available polyethylene and polypropylene at various ratios and plotting the formulation ratio and the absorbance ratio.

When the polyolefin (a1) is a polymer blend of polyethylene and polypropylene, the mass ratio of polyethylene and polypropylene (polyethylene/polypropylene) is preferably 15/85 or more, and more preferably 20/80 or more. When the polyolefin (a1) is a polymer blend of polyethylene and polypropylene, the mass ratio of polyethylene and polypropylene (polyethylene/polypropylene) is preferably 35/65 or less, and more preferably 30/70 or less.

By setting the mass ratio of ethylene units and propylene units or the mass ratio of polyethylene and polypropylene within the ranges indicated above, it is possible to achieve both adhesion durability at high temperature and adhesion durability at low temperature.

The polyolefin (a1) may include monomer units other than ethylene units and propylene units. Examples of the monomers that form monomer units other than ethylene units and propylene units include α-olefins such as 1-butene, 1-pentene, 1-hexene, and 4-methylpentene-1, diene-based monomers such as butadiene, isoprene, and chloroprene, unsaturated carboxylic acids and their derivatives such as vinyl acetate, an acrylic acid ester, acrylic acid, methacrylic acid, and a methacrylic acid ester, and aromatic vinyl compounds such as styrene. The content of the monomer units other than ethylene units and propylene units in the polyolefin (a1) is preferably 30% by mass or less, more preferably 20% by mass or less, and particularly preferably 10% by mass or less. When the content of the monomer units other than ethylene units and propylene units is within such a range, properties such as water resistance, chemical resistance, and durability of polyolefin are enhanced, and polyolefin can be produced at low cost.

Examples of methods of producing the polyolefin (a1) include known production methods using polymerization catalysts. Examples of polymerization catalysts include Ziegler catalysts and metallocene catalysts, and examples of polymerization methods include slurry polymerization and gas phase polymerization. An impact resistant polypropylene, referred to as a polypropylene block polymer, is substantially a mixture of polypropylene and a propylene-ethylene random copolymer, and can be produced by a process consisting of a first step of obtaining a homopolymer of propylene and a second step of obtaining a propylene-ethylene random copolymer.

The acid compound (a2) is selected from the group consisting of an unsaturated carboxylic acid, an unsaturated carboxylic acid anhydride, and a combination thereof.

The unsaturated carboxylic acid is a compound having an ethylenic double bond and a carboxylic acid group within the same molecule, and examples thereof include various unsaturated monocarboxylic acids and unsaturated dicarboxylic acids.

Specific examples of the unsaturated monocarboxylic acids include acrylic acid, methacrylic acid, crotonic acid and isocrotonic acid.

Specific examples of the unsaturated dicarboxylic acids include maleic acid, fumaric acid, itaconic acid, citraconic acid, nadic acid and endic acid.

The unsaturated carboxylic acid anhydride is a compound having an ethylenic double bond and a carboxylic acid anhydride group within the same molecule, and examples thereof include acid anhydrides of the aforementioned unsaturated dicarboxylic acids.

Specific examples of the acid anhydrides of unsaturated dicarboxylic acids include maleic anhydride, fumaric anhydride, itaconic anhydride, citraconic anhydride, nadic anhydride and endic anhydride.

Among these, maleic acid and maleic anhydride are preferably used and maleic anhydride is particularly preferably used due to high modification effect.

These acid compounds (a2) may be used singly or in combination of two or more.

A known method can be employed as a graft modification method. Examples thereof include a method of graft-reacting the acid compound (a2) with the polyolefin (a1) in a molten state or a solution state in the presence of a radical polymerization initiator such as an organic peroxide or an aliphatic azo compound.

The temperature of the graft reaction is preferably from 80 to 160° C. when reacting in a solution state, and is preferably from 150 to 3000° C. when reacting in a molten stat. In each of the solution state and the molten state, a temperature that is equal to or higher than the lower limits of the aforementioned reaction temperature ranges results in increased reaction rate and a temperature that is equal to or lower than the upper limits of the aforementioned reaction temperature ranges results in suppression of decrease in molecular weight of the resin, and the mechanical strength of the resulting acid-modified polyolefin (A) can be maintained.

The radical polymerization initiator to be used may be selected from commercially available organic peroxides in consideration of the reaction temperature and the like.

When the acid compound (a2) used for the graft modification is partially unreacted, it is preferable to remove the unreacted acid compound (a2) by a known method such as distillation under reduced pressure in order to suppress adverse effects on adhesive strength. Further, the acid-modified polyolefin (A) may partially include an unmodified polyolefin (a1) such as polyethylene, polypropylene, or an ethylene-propylene copolymer.

The amount of the acid compound (a2) grafted to the polyolefin (a1) in the graft modification is 0.2 parts by mass or more and preferably 0.4 parts by mass or more, with respect to 100 parts by mass of the polyolefin (a1) before the acid modification. When the amount of the acid compound grafted is within such a range, adhesiveness of the adhesive composition can be enhanced.

The amount of the acid compound (a2) grafted to the acid-modified polyolefin (A) in the graft modification is 5 parts by mass or less and preferably 2 parts by mass or less, with respect to 100 parts by mass of the polyolefin (a1). When the amount of the acid compound (a2) grafted is within such a range, adhesion durability in water of the adhesive composition can be enhanced.

The acid value of the acid-modified polyolefin (A) is preferably 0.041 meq/g or more, and more preferably 0.082 meq/g or more. The acid value of the acid-modified olefin (A) is preferably 1.02 meq/g or less, and more preferably 0.408 meq/g or less.

The melting point of the acid-modified polyolefin (A) is preferably 130° C. or higher, and more preferably 135° C. or higher. When the melting point of the acid-modified polyolefin (A) is within such a range, heat resistance and adhesive strength at high temperature of the adhesive composition are improved. The melting point of the acid-modified polyolefin (A) is preferably 150° C. or lower, and more preferably 145° C. or lower. When the melting point of the acid-modified polyolefin (A) is within such a range, adhesion durability at low temperature of the adhesive composition is improved.

In the present invention, the melting point means a temperature at the apex of the endothermic peak that appears in the process of maintaining at 180° C. for several minutes, cooling to 0° C. thereafter, and then raising to 200° C. by 10° C. per minute, using a differential scanning calorimeter (DSC).

The melt flow rate of the acid-modified polyolefin (A) is preferably 3 g/10 min or more, and more preferably 7 g/10 min or more. The melt flow rate of the acid-modified polyolefin (A) is preferably 50 g/10 min or less, and more preferably 30 g/10 min or less.

In the present invention, the melt flow rate means a value measured at a resin temperature of 230° C. and a load of 2.16 kg in accordance with JIS K7210:2014.

The content of the acid-modified polyolefin (A) in the adhesive composition is preferably 60% by mass or more, more preferably 70% by mass or more, particularly preferably 80% by mass or more, and may be 100% by mass.

A polymer other than the acid-modified polyolefin (A) (hereinafter referred to as other polymer) can be added to the adhesive composition for the purpose of improving adhesive strength at low temperature, adhesive durability, molding stability, and miscibility between resins. Examples of the other polymer include styrene block copolymers such as an ethylene-propylene rubber, a styrene-butadiene-styrene block copolymer and a hydrogenated product thereof, a styrene-isoprene-styrene block copolymer and a hydrogenated product thereof, and a styrene-isobutylene-styrene block copolymer and a hydrogenated product thereof.

When using the other polymer, the lower limit of the content of the other polymer in the adhesive composition is preferably 1% by mass or more, more preferably 2% by mass or more, and particularly preferably 3% by mass or more. When the addition amount of the other polymer is within such a range, improvement effect of the other polymer is enhanced.

When using the other polymer, the upper limit of the content of the other polymer in the adhesive composition is preferably 20% by mass or less, more preferably 15% by mass or less, and particularly preferably 10% by mass or less. When the addition amount of the other polymer is within such a range, the adhesive composition can obtain high heat resistance and high adhesive strength at high temperature.

The adhesive composition may further include an additive selected from the group consisting of an antioxidant, an ultraviolet absorber, a filler, reinforcing fibers, a release agent, a processing aid, a flame retardant, a plasticizer, a nucleating agent, an antistatic agent, a pigment, a dye, a foaming agent, and a combination thereof.

The storage modulus of the adhesive composition at 23° C. as measured by a rheometer is 130 MPa or higher, preferably 150 MPa or higher, and more preferably 175 MPa or higher. When the storage modulus is within such a range, adhesive strength at high temperature of the adhesive composition is improved. The storage modulus of the adhesive composition at 23° C. is 330 MPa or less, preferably 300 MPa or less, and more preferably 200 MPa or less. When the storage modulus is within such a range, adhesive strength at low temperature of the adhesive composition is improved.

Here, the measurement conditions of a rheometer are a frequency of 1 Hz, a strain range of from 0.01 to 0.2%, and a rate of temperature increase of 2° C./min. The storage modulus described in the present specification is a storage modulus at 23° C. when the temperature is raised from −50° C. to 180° C. under these conditions.

One example of methods of adjusting the storage modulus to an appropriate range is to adjust the formulation amount of an amorphous polyolefin such as an ethylene-propylene rubber or a styrene block copolymer. By increasing these, the storage modulus can be lowered.

The yield modulus of the adhesive composition at 23° C. in a tensile test is 30 MPa or higher, preferably 50 MPa or higher, and more preferably 60 MPa or higher.

When the yield modulus is within such a range, adhesive strength at high temperature of the adhesive composition is improved. The yield modulus of the adhesive composition at 23° C. in a tensile test is 120 MPa or less, preferably 100 MPa or less, and more preferably 80 MPa or less. When the yield modulus is within such a range, adhesive strength at low temperature of the adhesive composition is improved.

Here, the measurement conditions for the tensile test are a jig distance of 35 mm at the start of the test and a tensile speed of 50 mm/min. The yield modulus described in the present specification is a yield modulus as measured by a commercially available tensile tester using a strip-shaped test piece having a thickness of from 100 to 300 μm and a size of 10 mm×60 mm under these conditions. The strip-shaped test piece having a thickness of from 100 to 300 μm and a size of 10 mm×60 mm can be produced by press molding or the like. The yield modulus means an elastic modulus determined by dividing the stress (yield stress) at the yield point (the point where the stress shows a maximum value) by the strain (yield strain).

One example of methods of adjusting the yield modulus to an appropriate range is to adjust the formulation amount of an amorphous polyolefin such as an ethylene-propylene rubber or a styrene block copolymer. By increasing these, the yield modulus can be lowered.

The tensile breaking strain of the adhesive composition at each of 23° C. and −10° C. in a tensile test is preferably 200% or more. When the tensile breaking strain at each of 23° C. and −10° C. in a tensile test is 200% or more, the adhesive composition becomes excellent in adhesion stability at low temperature. The tensile test is the same as that performed in the measurement of the yield modulus described above. Although the upper limit of the tensile breaking strain is not particularly limited, the tensile breaking strain of the adhesive composition at each of 23° C. and −10° C. in a tensile test may be, for example, 500% or less.

The yield strain of the adhesive composition at 23° C. in a tensile test is preferably 11% or more, more preferably 12% or more, and particularly preferably 15% or more. When the yield strain at 23° C. is within such a range, the adhesive composition is excellent in adhesive strength at low temperature. The tensile test is the same as that performed in the measurement of the yield modulus described above. Although the upper limit of the yield strain is not particularly limited, the yield strain of the adhesive composition at 23° C. in a tensile test may be, for example, 30% or less.

The adhesive composition can be molded into a film and used as a film-like hot-melt adhesive. By using the film-like hot-melt adhesive, it becomes possible to dramatically increase productivity of the bonding/sealing process, which enables mass production of bonded bodies with fine, precise, and complex fused parts in a short period of time and at a low cost.

The film-like hot-melt adhesive is usually made of the adhesive composition, but may include other component such as moisture.

The content of the adhesive composition in the film-like hot-melt adhesive is preferably 50% by mass or more, more preferably 70% by mass or more, and particularly preferably 90% by mass or more.

The thickness of the film-like hot-melt adhesive is preferably 10 μm or more, and more preferably 20 μm or more. When the thickness of the film-like hot-melt adhesive is within such a range, the film-like hot-melt adhesive has high adhesiveness. The thickness of the film-like hot-melt adhesive is preferably 300 μm or less, and more preferably 200 μm or less. When the thickness of the film-like hot-melt adhesive is within such a range, the film-like hot-melt adhesive can exhibit excellent adhesion performance, productivity and economy. In addition, it is possible to prevent the film-like hot-melt adhesive from squeezing out when the film-like hot-melt adhesive is pressure-bonded to an adherend.

By using the film-like hot-melt adhesive as a surface layer of a multilayer film, it is possible to obtain an adhesive/sealing member with even higher performance and functionality.

In this case, a multilayer film including a surface layer that is formed of the film-like hot-melt adhesive and a substrate that includes a heat-resistant resin is particularly preferably used.

The surface layer is a layer that is layered on the substrate layer, and may be formed on only one side of the substrate layer or may be formed on both sides of the substrate layer. A primer layer may be provided between the surface layer and the substrate layer. Although not particularly limited, the heat resistant resin preferably has a softening temperature of 130° C. or higher. When the softening temperature of the heat-resistant resin is 130° C. or higher, heat resistance, rigidity, and dimensional stability of the multilayer film are improved. Here, the softening temperature is a temperature at which the storage modulus as measured by a rheometer is 10 MPa or less. The measurement conditions of the rheometer are the same as those used in the measurement of the storage modulus described above. The content of the heat-resistant resin in the substrate layer is not particularly limited, but is preferably 50% by mass or more, more preferably 70% by mass or more, particularly preferably 90% by mass or more, and may be 100% by mass.

Specific examples of the heat-resistant resin include polyester resins such as polyethylene terephthalate (PET), polybutylene terephthalate (PBT), polyethylene naphthalate (PEN), and a polyarylate, polyolefin polymers such as a cyclic olefin polymer (COP), a cycloolefin copolymer, and a methylpentene polymer (TPX), polyamide resins such as nylon-6, nylon-6,6, and an aromatic polyamide, polyetheramides, polyamideimides, polyimides, polyetheretherketones, polyetherketones, polyketones, polysulfones, polyether sulfones, polyphenylsulfones, polyphenylene sulfides, polyphenylene ethers, alloys made of polyphenylene ethers and polystyrenes, alloys made of polyphenylene ethers and polypropylenes, alloys made of polyphenylene ethers and polyamides, alloys made of polyphenylene ethers and cyclic olefin polymers or cycloolefin copolymers, polyacetals, and polycarbonates. Among these, at least one of polyethylene naphthalate, a cyclic olefin polymer, a cycloolefin copolymer, a polyphenylene ether, or an alloy including 50% or more of a polyamide resin is preferably used from the viewpoint of heat resistance, rigidity, and dimensional stability.

The thickness of the surface layer is the same as the thickness of the film-like hot-melt adhesive described above, but is particularly preferably from 10 to 100 μm. By setting the thickness of the surface layer to 10 μm or more, the multilayer film can have favorable adhesiveness. By setting the thickness of the surface layer to 100 μm or less, the multilayer film can have favorable heat resistance and mechanical strength.

The thickness of the substrate layer is particularly preferably from 50 to 300 μm. By setting the thickness of the substrate layer to 50 μm or more, the multilayer film can have favorable heat resistance, rigidity, and dimensional stability. By setting the thickness of the substrate layer to 300 μm or less, it is possible to reduce manufacturing cost and to impart appropriate flexibility to the multilayer film.

A bonded body can be produced by adhering the film-like hot-melt adhesive or the multilayer film using it to various adherends such as metal, glass, or plastic.

The metal used as the adherend may be a generally known metal plate, flat metal plate or metal foil, and may be iron, copper, aluminum, lead, zinc, titanium, chromium, stainless steel, or the like. Among these, iron, aluminum, titanium, and stainless steel are particularly preferable.

The adhesive composition can be produced, for example, by a method of melt-kneading the acid-modified polyolefin (A) and, if necessary, other components by means of an extruder, Banbury mixer, hot rolls, or the like, cooling and solidifying a strand with water or the like while pulling the strand extruded from the nozzle hole of the die head, and cutting into pellets. The temperature of the melt-kneading is preferably from 150 to 270° C., and more preferably from 170 to 250° C. The kneading time is usually from 0.5 to 20 minutes, and preferably from 1 to 15 minutes.

The adhesive composition thus obtained can be molded into various shapes according to the application by conventionally known methods such as compression molding, injection molding, extrusion molding, multi-layer extrusion molding, profile extrusion molding or blow molding. In the case of producing a resin sheet or a film suitable for adhesion or sealing, the adhesive composition may be melted by a single-screw extruder, passed through rolls to form into a sheet having a predetermined thickness, cooled, and wound up.

Examples

Examples and Comparative Examples are shown below to explain the present invention more specifically. In the following description, "parts" mean parts by mass, and "%" means % by mass, unless otherwise specified. Also, unless otherwise specified, "PP" means polypropylene, "PE" means polyethylene, and "MAH" means maleic anhydride.

<Creation of Calibration Curve>

Commercially available polyethylene resin (P9210, manufactured by Keiyo Polyethylene Co., Ltd.) and polypropylene resin (Waymax MFX3, manufactured by Japan Polypropylene Co., Ltd.) were melt-kneaded at various formulation ratios in an extruder, and the resulting resin mixture is molded using a desktop press molding machine to prepare a resin sheet having a thickness of about 2 mm.

Using Spectrum 100, manufactured by PerkinElmer, an IR spectrum was obtained from the cut surface of the resin sheet by an attenuated total reflection method (ATR method). A PE absorbance ratio was determined from the absorbance at 719 $cm^{-1}$ (PE characteristic absorption) and the absorbance at 1167 $cm^{-1}$ (PP characteristic absorption) in the obtained IR spectrum. A calibration curve was created by plotting the absorbance ratios and the formulation ratios at the time of melt-kneading. The results of the PE formulation ratio and the PE absorbance ratio are shown in Table 1, and the results of plotting are shown in FIG. 1.

The number of repetitions was 4 or more in consideration of measurement errors. The approximation curve of this plot was used as a calibration curve for determining the PE/PP formulation ratio.

TABLE 1

| PE Formulation Ratio (wt %) | PE Absorbance Ratio (%) |
|---|---|
| 0 | 3, 1, 3, 2 |
| 10 | 35, 41, 36, 32, 34, 33, 38 |
| 20 | 43, 56, 47, 48, 50, 46, 46 |
| 30 | 61, 62, 61, 66, 58, 58, 57, 64, 64, 66, 64, 63, 63 |
| 50 | 81, 83, 83, 74, 77, 75 |
| 70 | 91, 92, 91, 88, 85, 89 |
| 100 | 100, 100, 98, 96, 99 |

<Identification of Maleic Anhydride-Modified Polyolefin>

Maleic anhydride-modified polyolefins A to F each including polypropylene, polyethylene, an ethylene-propylene copolymer, and a maleic anhydride-modified product thereof as main components were prepared.

Each of the maleic anhydride-modified polyolefins A to F was molded into a resin sheet with a thickness of 2 mm, and the IR spectrum was similarly measured using the cross section of the sheet as the measurement surface. Based on the obtained IR spectrum, the created calibration curve was used to determine the PE/PP formulation ratio.

In addition, the amount of maleic anhydride contained was quantified by neutralization titration. In the neutralization titration, each of the maleic anhydride-modified polyolefins A to F as samples was heated and dissolved in xylene, and the resulting solution was titrated with an ethanol solution of potassium hydroxide using phenol red as an indicator. The results of the estimated PE/PP formulation ratio and the amount of maleic anhydride are shown in Table 2.

TABLE 2

| Maleic Anhydride-Modified Polyolefin | Formulation Ratio (wt %) | | MAH Amount (wt %) |
|---|---|---|---|
| | PE | PP | |
| A | 17 | 83 | 0.8 |
| B | 18 | 82 | 0.7 |
| C | 23 | 77 | 0.7 |
| D | 25 | 75 | 0.8 |
| E | 27 | 73 | 0.8 |
| F | 26 | 74 | 0.1 |

<Physical Properties of Maleic Anhydride-Modified Polyolefin>

[Viscoelastic Spectrum]

A sheet of each of the maleic anhydride-modified polyolefins A to F with a thickness of about 400 μm produced using a desktop press molding machine was cut into a circular shape to prepare a test piece for viscoelastic spectrum measurement. The viscoelastic spectrum of the test piece was measured using a rheometer MCR301, manufactured by Anton Paar. The measurement conditions were a frequency of 1 Hz, a strain range of from 0.01 to 0.2%, and a normal force of 0.01 N, and the test piece was heated from −50° C. to 180° C. at a temperature increase rate of 2° C./min. The storage modulus at 23° C. was recorded as a measure of elastic modulus. The storage modulus of each of the maleic anhydride-modified polyolefins A to F is shown in Table 3.

[Tensile Test]

A sheet of each of the maleic anhydride-modified polyolefins A to F with a thickness of from 100 to 300 μm produced using a desktop press molding machine was cut into a strip-shaped test piece with a size of 10 mm×60 mm to prepare a test piece for a tensile test. A tensile tester (Instron 5566A), manufactured by Instron, was used as the tensile tester, and the tensile test was performed with a distance between jigs of 35 mm at a tensile speed of 50 mm/min. The point at which the stress reached a maximum value after passing through the initial elastic region was defined as a yield point, the stress at the yield point was defined as a yield stress, and the strain at the yield point was defined as a yield strain. The strain was calculated with the initial length of the distance between jigs being 35 mm. The elastic modulus determined by dividing the yield stress by the yield strain was defined as a yield modulus. As the mechanical properties of the maleic anhydride-modified polyolefins A to F, the yield stress, yield strain, yield modulus, and breaking strain measured at 23° C. and the yield stress and breaking strain measured at −10° C. are shown in Table 3.

[Melt Flow Rate]

The melt flow rate (MFR) was measured using a commercially available melt indexer (G-02, manufactured by Toyo Seiki Seisakusho Co., Ltd.) in accordance with JIS K7210:2014 at a resin temperature of 230° C. and a load of 2.16 kg. The melt flow rate of each of the maleic anhydride-modified polyolefins A to F is shown in Table 3.

[Peel Strength]

Using a desktop press molding machine, a sheet of each of the maleic anhydride-modified polyolefins A to F with a thickness of from 100 to 300 μm was prepared. SUS304 plates with a thickness of 0.1 mm were used as adherends to sandwich both sides of the sheet of each of the maleic anhydride-modified polyolefins A to F between the SUS304 plates, and thermocompression bonded (180° C., 10 seconds, 4 MPa) by a precision press machine to prepare a bonded body. The bonded body was cut into strips having a width of 10 mm to obtain test pieces for a peel test. The peel strength of the test piece was measured by a T peel test. In the T peel test, a tensile tester (Instron 5564), manufactured by Instron, was used to peel the SUS304 plates at a tensile speed of 50 mm/min, and the peel strength in a stable area was defined as a peel strength (N/10 mm width). The peel strength of each of the maleic anhydride-modified polyolefins A to F is shown in Table 3.

[Adhesion Durability in Water]

A constant load immersion test was conducted in order to evaluate the adhesion durability in water. In the constant load immersion test, a test piece that is the same as the test piece used for measuring the peel strength described above was also used. One of the handle portions of the test piece was connected to a fixed base with a wire, and the other was connected to a weight. The test piece was hung in water together with the weight from the fixed base installed above the water surface, and a peeling load (2N or 4N) was applied in the water by the weight. In this regard, the time required for the SUS304 plates as the adherends to be completely separated (fall time) was measured. The adhesion durability in water was evaluated based on the length of the fall time of the SUS304 plates. A test in water at 95° C. was conducted to evaluate the adhesion durability at high temperature, and a test in water at 23° C. was conducted to evaluate the adhesion durability at low temperature. The results of the constant load immersion test of each of the maleic anhydride-modified polyolefins A to F are shown in Table 3.

TABLE 3

|  |  | Comparative Example 1 | Comparative Example 2 | Example 1 | Example 2 | Example 3 | Comparative Example 3 |
|---|---|---|---|---|---|---|---|
| Resin Composition | Maleic Anhydride-Modified Polyolefin | A | B | C | D | E | F |
|  | PE/PP Mass Ratio | 17/83 | 18/82 | 23/77 | 25/75 | 27/73 | 26/74 |
|  | Maleic Anhydride (wt %) | 0.8 | 0.7 | 0.7 | 0.8 | 0.8 | 0.1 |
| Storage Modulus (MPa) | Storage Modulus | 391 | 352 | 316 | 245 | 176 | 172 |
| Tensile Properties 23° C. | Yield Stress (MPa) | 18.3 | 15.1 | 13.5 | 12.6 | 9.8 | 8.2 |
|  | Yield Strain | 9.5% | 11.2% | 12.0% | 15.2% | 16.1% | 17.7% |
|  | Yield Modulus (MPa) | 154 | 136 | 113 | 85 | 61 | 57 |
|  | Breaking Strain | 117% | >200% | >200% | >200% | >200% | >200% |
| Tensile Properties −10° C. | Yield Stress (MPa) | 28.8 | 25.2 | 23.7 | 23.3 | 19.1 | 18.8 |
|  | Breaking Strain | 44% | 95% | >200% | >200% | >200% | >200% |
| MFR (g/10 min) | 230° C., 2.16 kg | 13.6 | 15.3 | 18.4 | 12 | 14.7 | 20 |
| Peel Strength (N/10 mm) | SUS/SUS | 22 | 31 | 30 | 33 | 31 | <1 |
| Constant Load Immersion Test | 23° C., Load 2N | 28 | 312 | >1,000 | >1,000 | >1,000 | <1 |
|  | 23° C., Load 4N | 3 | 63 | 580 | 820 | >1,000 | <1 |
| Fall Time (hr) | 95° C., Load 2N | 577 | >1,000 | >1,000 | >1,000 | >1,000 | <1 |

As can be seen from the results in Table 3, each of the maleic anhydride-modified polyolefins C, D, and E was long in peel strength and fall times in the constant load immersion test at both low temperature and high temperature, and was excellent in adhesiveness and adhesion durability in water.

INDUSTRIAL APPLICABILITY

The adhesive composition of the present invention, as well as the film-like adhesive and the multilayer film obtained by processing the same, are useful for bonding or sealing metal materials, and are preferably used for applications in which a resulting bonded body may be continuously or intermittently in contact with moisture.

Examples thereof include wires and cables in which metal conductors or optical fibers are covered with resin molded articles, automobile mechanical parts, automobile exterior parts, automobile interior parts, molded substrates for power supply, light reflectors for light source reflection, fuel cases for solid methanol batteries, thermal insulation materials for metal pipes, thermal insulation materials for automobiles, fuel cell water pipes, decorative molded articles, water cooling tanks, boiler exterior cases, ink peripheral parts and components for printers, water pipes, joints, secondary battery alkaline storage battery tanks, and gasket seal materials for various layered batteries.

This application claims priority to Japanese Patent Application No. 2020-158485 filed Sep. 23, 2020, the entire disclosure of which is incorporated herein.

What is claimed is:

1. An adhesive composition, comprising an acid-modified polyolefin (A) that is graft-modified with 0.2 to 5 parts by mass of an acid compound (a2) with respect to 100 parts by mass of a polyolefin (a1), wherein the acid compound (a2) is selected from the group consisting of an unsaturated carboxylic acid, an unsaturated carboxylic acid anhydride, and a combination thereof, wherein the polyolefin (a1) is selected from the group consisting of a polymer blend of polyethylene and polypropylene, a propylene-ethylene copolymer, and a combination thereof, wherein a mass ratio of ethylene units and propylene units (ethylene units/propylene units) contained in the polyolefin (a1) is within a range of from 15/85 to 35/65, and wherein the adhesive composition has a storage modulus of from 130 to 330 MPa at 23° C. as measured by a rheometer and has a yield modulus of from 30 to 120 MPa at 23° C. in a tensile test.

2. The adhesive composition according to claim 1, wherein a content of the acid-modified polyolefin (A) is 60% by mass or more.

3. The adhesive composition according to claim 1, having a storage modulus of from 150 to 300 MPa at 23° C. as measured by a rheometer and having a yield modulus of from 50 to 100 MPa at 23° C. in a tensile test.

4. The adhesive composition according to claim 1, having a tensile breaking strain of 200% or more at each of 23° C. and −10° C.

5. The adhesive composition according to claim 1, having a tensile yield strain of 11% or more at 23° C.

6. A film-like adhesive, having a thickness of from 10 to 300 µm and comprising the adhesive composition according to claim 1.

7. A multilayer film, comprising a substrate layer and a surface layer that is layered on the substrate layer:

wherein the substrate layer contains a heat-resistant resin having a softening temperature of 130° C. or higher and has a thickness of from 50 to 300 µm; and wherein the surface layer is the film-like adhesive according to claim 6 and has a thickness of from 10 to 100 µm.

* * * * *